Dec. 24, 1968  R. L. FRYER  3,417,739
VARIABLE COMPRESSION RATIO PISTON VALVE CONSTRUCTION
Filed Dec. 8, 1967  2 Sheets-Sheet 1

INVENTOR
ROSS L. FRYER

BY Hauke, Krass, & Gifford
ATTORNEYS

INVENTOR
ROSS L. FRYER

BY Hauke, Krass, & Gifford
ATTORNEYS

United States Patent Office 3,417,739
Patented Dec. 24, 1968

3,417,739
VARIABLE COMPRESSION RATIO PISTON VALVE CONSTRUCTION
Ross L. Fryer, Grosse Pointe Woods, Mich., assignor to Continental Aviation and Engineering Corporation, Detroit, Mich., a corporation of Virginia
Filed Dec. 8, 1967, Ser. No. 689,105
11 Claims. (Cl. 123—78)

ABSTRACT OF THE DISCLOSURE

A pressure regulating valve construction especially suitable as a discharge valve for variable compression ratio piston assemblies but having other uses as well and including a first pressure actuated area for producing initial opening of the valve and a larger pressure actuated area opened only after initial opening of the valve to produce a quick, full opening once initial opening has been achieved.

Background of the invention

The present invention relates to an internal combustion engine particularly to such engines employing means for varying the compression ratio thereof and more particularly to an improved means for controlling relative movement of two-part pistons such as those disclosed in U.S. Patents Nos. 3,156,162, 3,161,112, 3,185,137, 3,185,138, 3,303,831, 3,311,096 all asssigned to the assignee of the present application.

In each of the aforesaid patents, a two-part variable compression ratio piston is disclosed in which an inner member or piston pin carrier is connected in the usual manner to a connecting rod and carries an outer member or shell which is movable axially relative to the inner member. Clearance spaces are provided between the top and bottom ends of the inner and outer members and these form upper and lower chambers which vary conversely in volume in relation to the relative movement of the members. The chambers are adapted to contain an incompressible fluid such as oil. By controlling the flow of oil to and from these chambers, the movement of the outer member relative to the inner member in response to piston reciprocation and combustion chamber pressure is controlled for varying the clearance volume of the cylinder in which the piston reciprocates to thereby vary the compression ratio of the engine.

In addition, Patent No. 3,303,381 discloses such a construction which includes a pressure regulating valve having a small working surface exposed to the oil to produce initial opening of the valve. Once the valve is unseated, a larger working surface is exposed to the oil pressure so that the valve will open quickly.

Summary of the invention

The present invention provides a pressure regulating valve assembly including the advantages of the construction disclosed in Patent No. 3,303,831. In addition, the construction of the present invention includes means accessible from the underside of the piston for adjusting the spring tension opposing the valve opening so that the valve member can be readily adjusted to regulate the combustion chamber pressure at which it will open. Heretofore such an adjustment was not possible and if it were found that the valve member opened at the wrong combustion chamber pressure it was necessary to remove and replace the valve with a new unit. This was a difficult operation and required disassembly of a substantial portion of the engine.

Further the particular construction of the present invention, as will become more apparent as the description proceeds, provides a valve assembly in which jamming at some intermediate open position is not likely.

Brief description of the drawings

A preferred embodiment of the present invention is more completely described in the following description which makes reference to the accompanying drawings in which like reference characters refer to like parts throughout the several views and in which.

Description of a preferred embodiment

Figure 1:
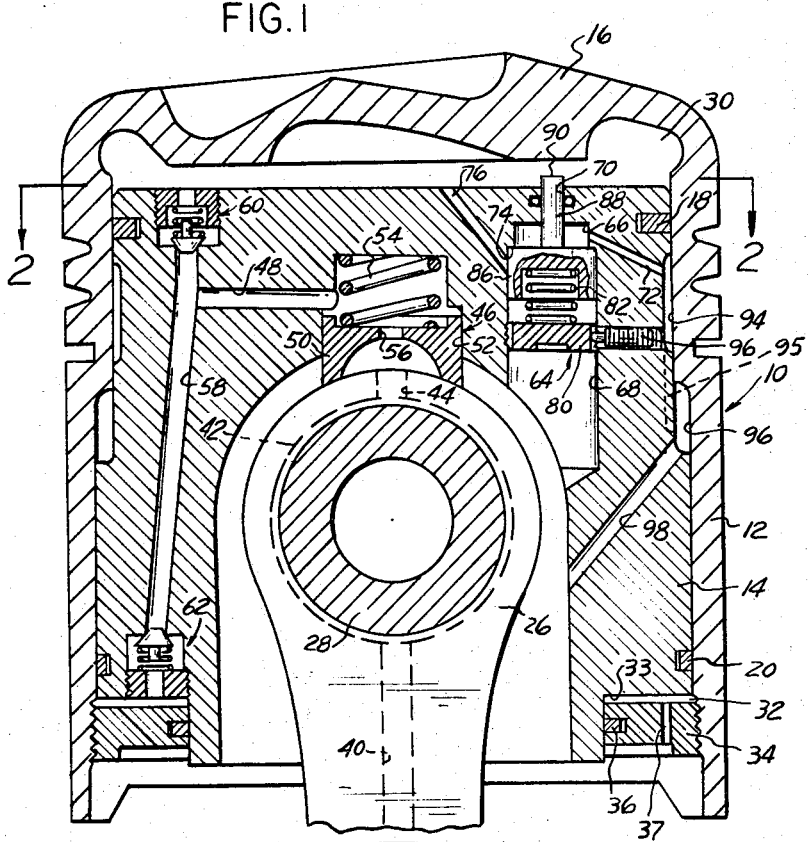
FIG. 1 is a vertical section through the axis of an improved variable compression ratio piston constructed in accordance with the present invention.
Figure 2:
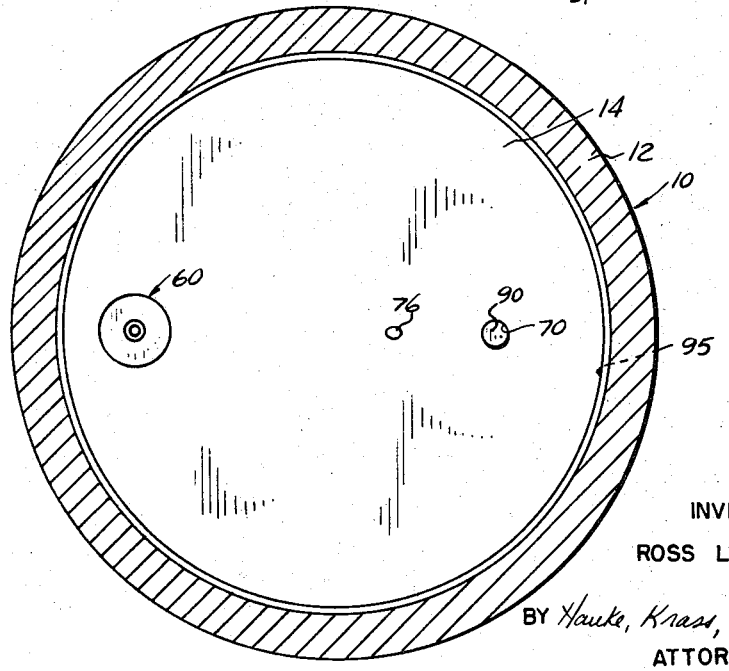
FIG. 2 is a view taken substantially on line 2—2 or FIG. 1.

Now referring to the drawings for a more detailed description of the present invention, a preferred variable compression ratio (VCR piston 10 is illustrated and is adapted for reciprocation in the bore of a cylinder of an internal combustion engine. The piston 10 consists of two parts, an outer member or shell 12 which is carried on an inner member or piston pin carrier 14. The outer member 12 has a crown 16 which serves as the head of the piston 10 and which forms a movable wall of the lower boundary of a combustion chamber. The inner member 14 is axially slidable within and with respect to the outer member 12 and is provided with rings 18 and 20 which sealingly engage the inner surface of the outer member 12. Inner member 14 is linked to the crankshaft of the engine by a connecting rod 26 and a wrist pin 28 in the conventional manner. Thus, the inner member 14 is mvoable axially between fixed upper and lower limits in the manner of a conventional piston while the outer member 12 can move axially upwardly and downwardly within limits which will be presently described.

An upper variable volume chamber 30 is formed intermediate the upper surface of the inner member 14 and the lower surface of the crown 16. A lower variable volume chamber 32 is formed intermediate a lower surface formed by an annular recess 33 at the lower end of the inner member 14 and the upper surface of a ring 34 carried by the outer member 12. A sealing ring 36 is carried by the ring 34 to provide a fluid seal between adjacent surfaces of the inner member 14 and ring 34. Restricted orifice 37 formed in the ring 34 connects the lower chamber 32 with the crankcase of the engine.

The ring 34 and the lower surface of the crown 16 defining the chamber 30 provide the limits of axial movement of the outer member 12 relative to the inner member 14. This relative movement provides a variable height from the center of the wrist pin 28 to the top of the piston crown 16 to thereby vary the compression ratio of the engine.

The movement of the outer member 12 upwardly (FIG. 1) relative to inner member 14 expands upper chamber 30 while contraction of these members expands lower chamber 32. This movement of the outer member 12 relative to the inner member 14 then can be automatically controlled by regulation of the flow of an incompressible fluid into and out of the chambers 30 and 32. In the present invention the control fluid preferably comprises oil supplied to the pitson 10 from the usual pressurized lubricating supply of the engine by an oil passage 40 formed in the connecting rod 26.

Passage 40 preferably connects with an annular groove 42 encircling the pin 28 and leading to an outlet 44 connected by way of a slipper collector assembly 46 to a passage 48 formed in the inner member 14. The slipper collector assembly 46 is similar to that disclosed in the aforementioned patents and preferably comprises a collector cap 50 carried in a cavity 52 formed in the inner member 14 and urged by a spring 54 into sealing engagement with the upper surface of the connecting rod 26 so that oil is directed from the outlet 44 to the interior of the cap 50 in all positions of the connecting rod 26 with respect to the axis of the pin 28. An opening 56 is provided in the collector cap 50 which directs the oil to the passage 48. Passage 48 connects with a vertical passage 58 which in turn connects with the upper chamber 30 and the lower chamber 32 through one-way inlet check valve assemblies 60 and 62 respectively.

A pressure regulating discharge valve assembly generally indicated at 64 is carried by the inner member 14 as can best be seen in FIG. 1. As more clearly shown in FIGS. 3 and 4 the valve assembly 64 is preferably carried in a bore 66 and a counterbore 68. An axial guide passage 70 extends from the upper surface of the member 14 into the bore 66. A passage 72 connects with the bore 66 above an annular shoulder 74 formed at the juncture of the bore 66 and the counterbore 66 and a passage 76 connects the upper chamber 30 with the counterbore 68 below the shoulder 74.

Figure 3:
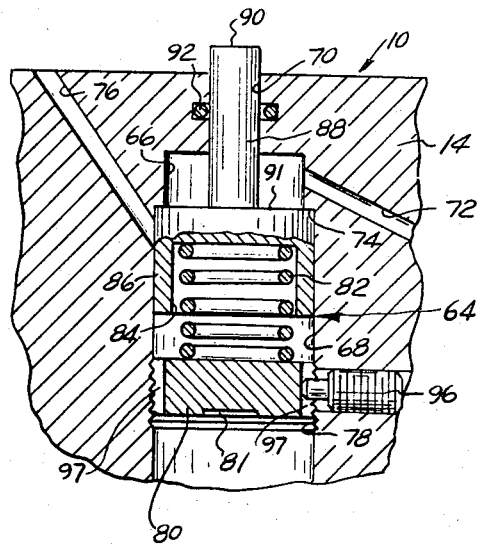
FIG. 3 is an enlarged sectional view of the pressure regulating discharge valve of the invention as shown in FIG. 1.
Figure 4:
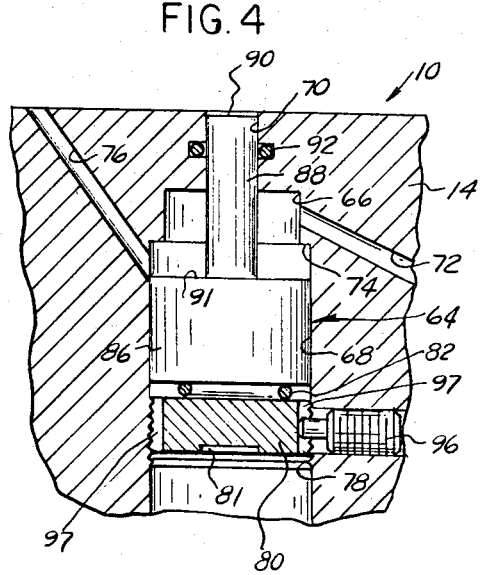
FIG. 4 is a view similar to FIG. 3 but illustrating the valve in an open position.

A lower portion of the counterbore 68 is internally threaded as shown at 78 in FIGS. 3 and 4 and this provides the means for adjustably mounting a spring seat member 80 within the counterbore 68. The member 80 is provided with a lower slot 81 so that it can be adjusted within the counterbore 68 by use of a suitable tool manipulated from the underside of the inner member 14. The member 80 provides the seat for one end of a spring 82 the other end of which extends into a recess 84 formed in the lower surface of a cylindrical valve member 86 to urge the valve member 86 against the annular shoulder 74. The member 80 is locked in a predetermined rotated position by any preferred means such as the plunger assembly 96 shown which fits into any one of a number of axial slots 97 provided in the member 80. An actuating plunger 88 extends axially upwardly from the upper surface of the valve member 86 and through the passage 70 to provide an upper surface 90 exposed to the fluid pressure within the upper chamber 30. An O-ring seal 92 prevents oil leakage along the surface of the plunger 88. The valve member 86 has an upper surface 91 spaced axially downwardly from and somewhat larger in area than the surface 90 and which when oil is admitted to the bore 66 by the passage 76 aids in moving the valve member 86 against the spring 84.

As can best be seen in FIG. 1 the passage 72 communicates with a cooling recess 94 formed in the inner member 14 in the ring groove area of the outer member 12 and which in turn registers with crankcase atmosphere by means of a collection chamber 96 and a passage 98.

It is apparent then that the valve member 86 is operable to open and close oil flow from the chamber 30 to crankcase atmosphere in response to a predetermined pressure being exerted on the surface 90 of the plunger 88 and then, after movement of the valve member 86 to open the passage 76, by this pressure acting on the surface 91 of valve member 86. Thus after the valve member 86 is moved initially by the pressure acting on the plunger 88 it is snapped open by the fluid pressure acting on the larger working surface 91.

*Operation*

Assuming that the combustion chamber pressure is below the predetermined maximum value which the VCR piston 10 is designed to maintain and that the upper and lower chambers 30 and 32 are both filled with oil, during the latter part of each upward stroke of the piston 10 at the end of the exhaust stroke and the early part of each downward intake stroke, the momentum of the outer member 12 tends to move it upwardly relative to the inner member 14 thereby tending to expand upper chamber 30 and contract lower chamber 32. The resulting increase in oil pressure in lower chamber 32 will cause the inlet valve assembly 62 to move to a closed position to thereby close oil flow between the lower chamber 32 and the passage 58. This will produce an hydraulic lock between the members 12 and 14 by reason of the oil being contained within the lower chamber 32 with the result that during each cycle of engine operation upward relative movement of the outer member 12 with respect to the inner member 14 will be slight and only to the degree permitted by the escape of oil from the lower chamber 32 by way of orifice 37. Similarly the tendency of the upper chamber 30 to expand during this position in the piston operation will cause the inlet valve assembly 60 to open oil flow from the passage 58 to the upper chamber 30.

The oil discharged from the lower chamber 32 through the restricted orifice 37 then permits a gradual cyclic decrease in the volume of the lower chamber 32 and thus a corresponding increase in the volume of the upper chamber 30 to provide relative upward movement between the outer member 12 and the inner member 14. As the upper chamber 30 increases in volume, oil from the lubrication system is directed through the inlet valve assembly 60 into the upper chamber 30 to maintain that chamber in a filled condition.

During the compression and power stroke, the gas pressure acting on piston crown 16 is transmitted to the inner member 14 through the oil in the upper chamber 30 creating a high oil pressure in this chamber. Whenever the gas pressure exceeds the selected upper limit, sufficient oil pressure is built up in the upper chamber 30 to open the discharge valve assembly 64 and release some of the oil from the upper chamber 30 to allow the outer member 12 to move downwardly relative to the inner member 14 and thus to decrease the compression ratio of the engine. The downward relative movement of the outer member 12 enlarges lower chamber 32 and the valve assembly 62 moves to a position opening the lower chamber 32 to passage 58 and oil then enters the lower chamber 32 to keep it fully charged.

The amount of oil discharged from the upper chamber 30 during any compression stroke depends upon the margin by which the cylinder gas exceeds that necessary to cause the discharge valve assembly 64 to open and the duration of this excess pressure. The valve spring setting and the magnitude of duration of the excess gas pressure determines the downward movement of outer member 12 relative to the inner member 14. The upward relative movement on the other hand is the same on each exhaust and induction stroke and is determined by the size of the fixed orifice 37. If the upward and downward relative movements are equal as is the case when the engine is running under a constant load, the effective compression ratio will remain unchanged. If the load is increased, the downward movements thus will exceed the upward movements lowering the compression ratio until an equilibrium has been established. Conversely, if the load is reduced, the compression ratio will increase to a new point of equilibrium.

The present invention, like the previously mentioned Patent No. 3,303,831, also includes the provision of a small working face in the form of the plunger surface 90 for initial movement of the valve member 86 upon a predetermined pressure being built up in the chamber 30 thus permitting the use of a weaker spring and less material for the valve member 86 all as described in the aforementioned patent. Further, like the aforementioned patent, the valve member 86 of the present invention is provided with a larger working face in the form of the upper surface 91 of the valve member 86 which is exposed to the pressure of the oil discharged from passage 76 upon the valve member 86 being moved from the position illustrated in FIG. 3 to the position illustrated in FIG. 4 by fluid pressure acting on the surface 90. With the valve member 86 in the position illustrated in FIG. 4 oil is discharged from chamber 30 to crankcase atmosphere by way of passages 76 and 72, chambers 94 and 96 and passages 95 and 98. Thus, like the previous disclosure the discharge valve assembly 64 of the present invention provides a valve in which upon initial opening being produced a sudden increase in the valve opening force is provided resulting in a snap opening action which is beneficial in obtaining instantaneous control of oil pressure in chamber 30. The present assembly offers a substantial improvement over the construction illustrated in the patent, however, in that by providing the spring seat member 80 and means for adjustably mounting the member within the counterbore 68 an effective means is provided for varying the valve opening opposing force exterted by spring member 82. In this way it is possible to manually adjust the combustion chamber presure at which the discharge valve assembly 64 will open and such an adjustment can be readily made by inserting a tool from the underside of the piston. Previously such an adjustment required disassembly of the valve and in many instances entire replacement with a new present valve assembly. The present construction permits adjustments to be made to produce optimum results after the engine has been running.

In addition, the particular construction of the discharge valve assembly 64 of the present invention provides an assembly in which the tendency of particles within the valve assembly to interfere with the proper operation of the valve member is substantially lessened. This is by reason of the fact that unlike previously disclosed similar valve assemblies less tolerances are needed between the valve member 86 and the counterbore 68 and as long as the surface 91 of the valve member 86 is against the shoulder 74 sufficiently to block the passage 76 there will be no fluid flow through the valve. The particular construction of the valve assembly 64 also produces a shearing effect on any foreign particles which may be in this area. It is also to be noted that unlike previously disclosed similar valve assemblies the small working surface 90 is disposed at a point axially spaced from the working surface 91 and the effect of the pressure acting on the surface 90 is guaranteed by reason of the fact that it is positioned directly within the chamber 30 and not downwardly in the valve assembly as in previously disclosed similar valve assemblies.

It should be understood that the proportions of the surfaces 90 and 91 and the size of the exit passage 72, which passage size controls the build-up of pressure in the chamber above the surface 91, together with the proper setting of the spring 82, control the action of the valve assembly 64. Therefore the respective sizes and values should be properly related in order to assure accurate valve operation in the VCR piston. For instance, an improper adjustment could cause the piston to travel to the lowest ratio and never recover. As explained earlier, the recovery occurs during the inertia strokes and is controlled by the small fixed orifice.

From the foregoing description it is now apparent that an improved VCR piston and valve structure have been disclosed.

I claim:

1. A valve assembly for regulating fluid flow intermediate two areas, said valve assembly comprising,
   (a) a valve member movable intermediate a position opening a fluid path from one area to the other and a position closing said fluid path,
   (b) means for actuating said valve member comprising a first surface disposed within said first area and operable to move said valve member from said closed position toward said open position and a second surface larger in area than said first surface and axially spaced therefrom and a passage directing fluid from said first area to said second surface only after movement of said valve member toward said open position.

2. The valve assembly as defined in claim 1 and including
   (a) an axially movable plunger having said first surface disposed at one end thereof,
   (b) said valve member being secured to the opposite end of said plunger and being movable therewith and said second surface being disposed on said valve member.

3. The valve assembly as defined in claim 1 and including,
   (a) means biasing said valve member toward said closed position, and
   (b) means for manually adjusting the force exerted by said biasing means.

4. In an internal combustion engine, a piston having first and second parts movable relative to one another in response to reciprocation of the piston with respect to a combustion chamber of the engine, and having a pressure fluid chamber within said piston which varies in internal volume in response to said relative movement and to variations in the quantity of pressure fluid therein, the combination theerwith of,
   (a) means forming a fluid flow passage communicating with said fluid chamber,
   (b) a valve member carried by said piston and movable to open and close said passage for controlling flow of fluid therethrough to vary the quantity of fluid in said fluid chamber,
   (c) means for yieldably biasing said valve member toward a closed position, and
   (d) means for actuating said valve member toward an open position comprising a first surface disposed in registry with said fluid chamber and operable to move said valve member from said closed position toward said open position and a second surface larger in area than said first surface and axially spaced therefrom, and a passage directing fluid fromsaid fluid chamber to said second surface only after movement of said valve member toward said open position.

5. In an internal combustion engine, a piston having inner and outer members movable relative to one another in response to reciprocation of the piston with respect to a combustion chamber of the engine, and having a pressure fluid chamber within said piston which varies in internal volume in response to said relative movement and to variations in the quantity of pressure fluid therein, the combination therewith of,
   (a) means forming a fluid flow passage communicating with said chamber,
   (b) a valve member carried by said piston and movable to open and close said passage for controlling the flow of fluid therethrough to vary the quantity of fluid in said chamber,
   (c) means far yieldably biasing said valve member toward a closed position,
   (d) said valve means including a bore formed in said inner member and a cylindrical valve member axially slidably mounted within said bore and a plunger extending upwardly from said valve member, said plunger having an end registering with said chamber, said plunger and said valve member being movable axially together with increased pressure acting on said end of said plunger producing movement of said valve member toward an open position,
   (e) said passage means including a first passage connecting said bore with said chamber and a second passage connecting said bore with atmosphere, said valve member being movable intermediate positions opening and closing communication between said passages.

6. The combination as defined in claim 5 and in which said first passage registers with said bore at a point which requires movement of said valve member toward said open position before opening said first passage to said bore.

7. The combination as defined in claim 5 and in which said biasing means comprises a spring seat member axially adjustably mounted in said bore and a spring having one end engaging said valve member and the other engaging said spring seat member.

8. In an internal combustion engine, a piston having first and second parts movable relative to one another in response to reciprocation of the piston with respect to a combustion chamber of the engine, and having a pressure fluid chamber within said piston which varies in internal volume in response to said relative movement and to variations in the quantity of pressure fluid therein, the combination therewith of,
   (a) means forming a fluid flow passage communicating with said chamber,
   (b) a valve member carried by said piston and movable to open and close said passage for controlling flow of fluid therethrough to vary the quantity of fluid in said chamber,
   (c) means for yieldably biasing said valve member toward a closed position,
   (d) a plunger member axially movably mounted within said first part and having a working surface exposed to fluid pressure within said chamber and operable to move said plunger axially inwardly in response to increases in said fluid pressure,
   (e) said valve member being secured to the end of said plunger opposite said surface and movable therewith,
   (f) said valve member having a working surface larger than said plunger member working surface and operable upon being exposed to fluid pressure to add to the force moving said valve member toward an open position, and
   (g) means opening fluid pressure from said chamber to said last mentioned working surface only upon said valve member being moved toward said open position a predetermined amount.

9. The combination as defined in claim 8 and in which said last mentioned means comprises a bore connecting said chamber with said fluid passage and being closed by said valve member when said valve member is in said closed position.

10. The combination as defined in claim 8 and,
    (a) said valve member being cylindrical and being mounted in a cylindrical bore,
    (b) said plunger being cylindrical and of a smaller diameter and extending axially upwardly from said valve member and into said chamber whereby the upper end of said plunger forms said first mentioned working surface and the upper surface of said valve member forms said second mentioned working surface.

11. In an internal combustion engine a piston having first and second parts movable relative to one another in response to reciprocation of the piston with respect to a combustion chamber of the engine, and having a pressure fluid chamber within said piston which varies in internal volume in response to said relative movement and to variations in the quantity of pressure fluid therein, the combination therewith of,
    (a) means forming a fluid flow passage communicating with said chamber,
    (b) valve means carried by said piston and operable to open and close said passage for controlling the flow of fluid therethrough to vary the quantity of fluid in said chamber,
    (c) means for yieldably biasing said valve means toward a closed position,
    (d) said valve means including a bore formed in one of said parts, a reduced diameter section of said bore communicating with said chamber, a cylindrical valve member axially slidably mounted within said bore and a reduced diameter section of said valve member extending upwardly into said reduced diameter section of said bore so that a circular face of said reduced diameter section of said valve member registers with said chamber, whereby pressure in said chamber acts on said valve member to move same toward an open position,
    (e) said passage means including a first passage connecting said bore with said chamber and a second passage connecting said bore with atmosphere, said valve member being movable intermediate positions opening and closing communication between said passages, and
    (f) said valve member being provided with a second circular face disposed in said bore, larger in diameter than said first circular face and operable upon said valve member being moved to a position opening said first passage to said bore to increase the force urging said valve member toward the open position.

References Cited
UNITED STATES PATENTS

| | | |
|---|---|---|
| 1,828,976 | 10/1931 | McNaught. |
| 2,853,891 | 9/1958 | Tuck _____ 137—538 |
| 3,303,831 | 2/1967 | Sherman. |

WENDELL E. BURNS, *Primary Examiner.*

U.S. Cl. X.R.

91—392, 401, 422; 92—61; 137—494, 538